United States Patent Office 3,362,538
Patented Jan. 9, 1968

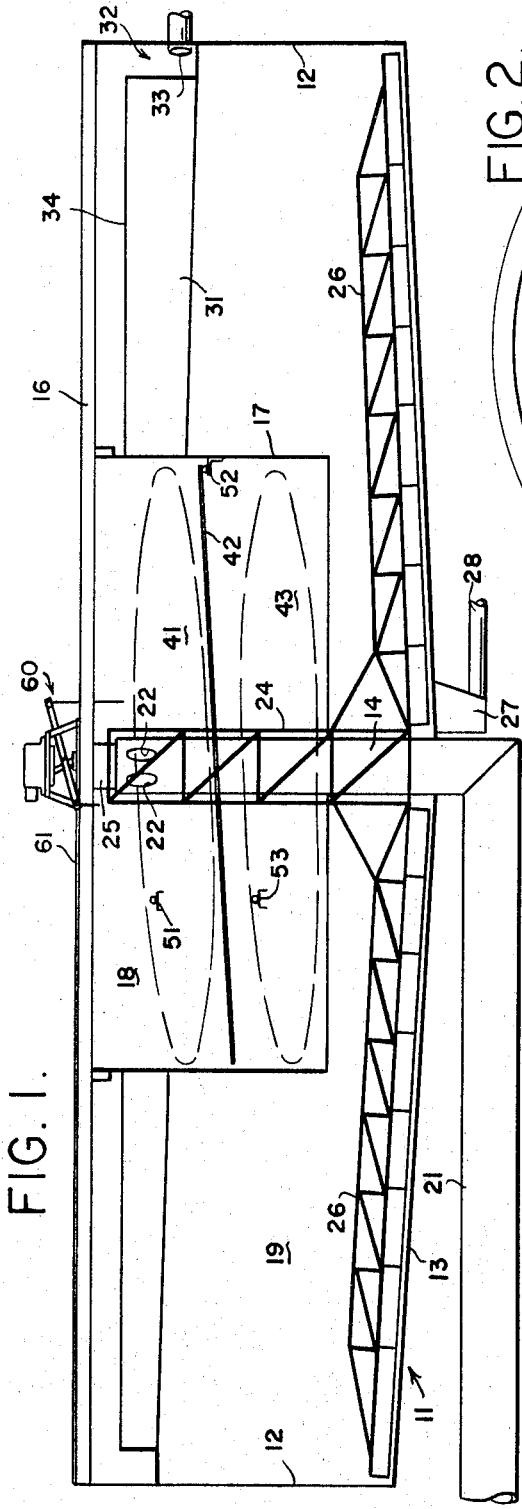
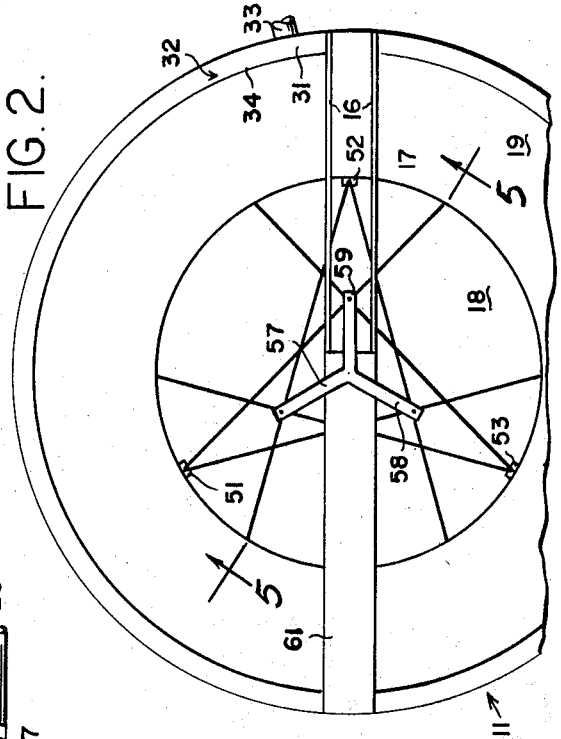
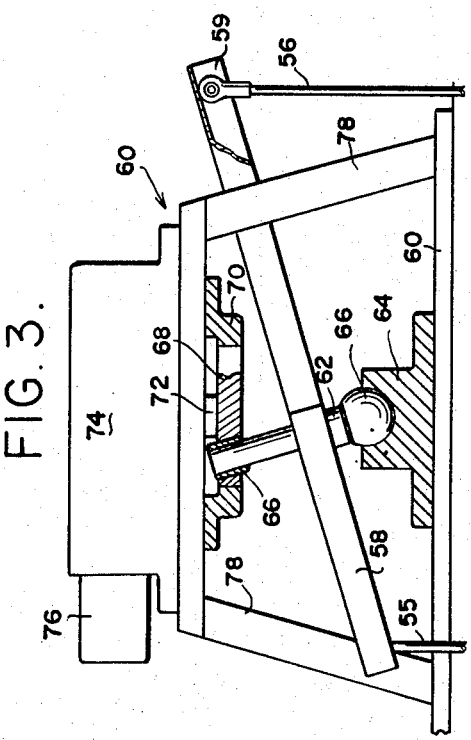

3,362,538
FLOCCULATING APPARATUS
William J. Katz, Milwaukee, and Fred Fixari, Greendale, Wis., assignors to Rex Chainbelt Inc., Milwaukee, Wis., a corporation of Wisconsin
Filed June 9, 1966, Ser. No. 556,498
7 Claims. (Cl. 210—208)

ABSTRACT OF THE DISCLOSURE

A flocculating apparatus used in a central mixing zone of a flocculating tank includes a series of vertically spaced generally horizontal paddle frames for random distribution and mixing. Each paddle frame has a separate modified nutating motion provided by universally supporting one point on the periphery of a paddle frame for a point on the tank and connecting other points on the paddle frame to hang rods driven from an upper nutating frame.

---

This invention relates to apparatus for gently mixing water and certain chemicals added thereto for the purpose of causing the dissolved impurities with which the chemicals react to flocculate so as to be removable by subsequent gravity settling.

According to the invention, the tank receiving the water with the chemicals added thereto has an upper central inlet and a lower peripheral outlet. A vertical series of horizontal paddles are arranged within the tank and are supported in a particular manner. Each paddle is supported at a fixed point at the wall of the tank and at two other spaced points by support cables extending downwardly thereto. The upper ends of the support cables are connected to the free ends of horizontally extending lever arms. The other ends of the arms are fixed to a shaft having a lower universal supporting bearing and an upper end which is eccentrically disposed in a vertical rotating crank arm such that the rotation of the crank arm effects the periodic upward and downward movement of the arms and a modified nutating motion of the paddles.

According to the invention, the paddles are relatively arranged about a central vertical axis so that while their motion is periodic, there is no uniformity of motion as to any vertically adjacent sections of the paddles. Accordingly, the motion of the paddles or at least the mixing action provided is random for all practical purposes.

An object of the invention is to provide an improved flocculating mechanism which will assure the random distribution and mixing of the chemicals in the water being treated.

Another object is to provide an improved mechanism having the major portions of the mechanism above water and having downwardly supporting means allowing an upwardly extending inlet pipe to be located intermediate said supporting means.

Another object of the invention is to provide flocculating apparatus which is more readily accessible for service, repair and maintenance as required.

Other objects and advantages of the invention will appear in the following description of the same as illustrated in the accompanying drawings.

The drawings furnished herewith illustrate the best mode of carrying out the invention as presently contemplated and set forth hereinafter.

In the drawings:

FIG. 1 is a vertical cross section of a gravity settling tank with a central flocculating zone in which the paddles are supported by the nutating mechanism. The outlines of the paddles are shown in broken lines;

FIG. 2 is a partial plan view of the tank shown in FIGURE 1. The frame members of the paddles are shown by single lines;

FIG. 3 is an enlarged side elevation of the drive mechanism shown in FIGURE 1;

Figure 4:
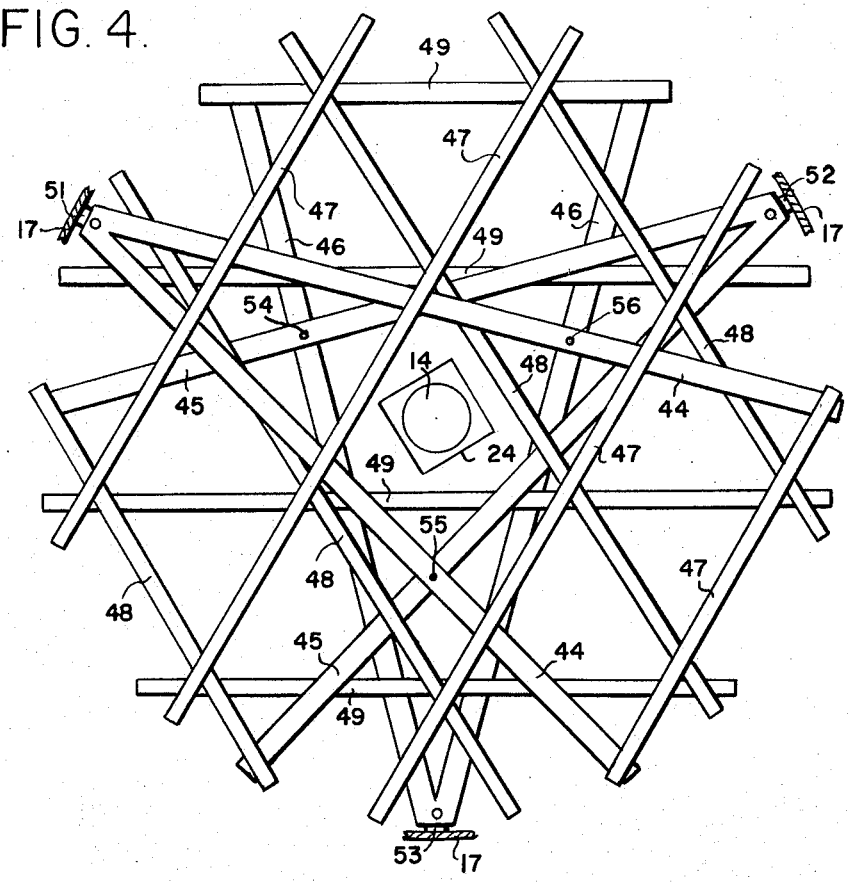
Figure 5:
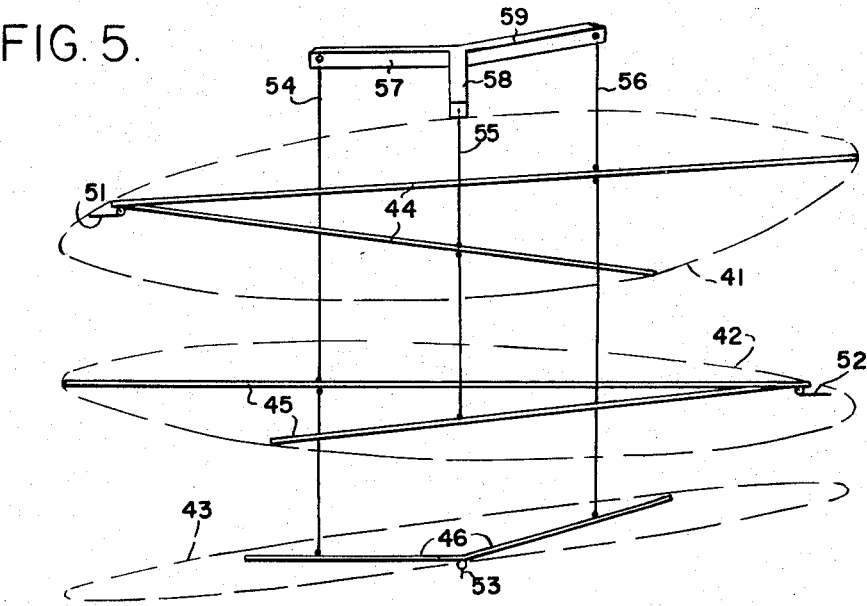

FIG. 4 is an enlarged plan of the paddles. For the purposes of the view each paddle is provided with only several boards; and FIG. 5 is a side elevation showing the relationship of the frame members of the paddles and the supporting lever arms. The plane of this figure is parallel to line 5—5 of FIG. 2.

The tank 11 shown in the drawings includes the vertical, circular side wall 12 and the bottom 13 which slopes from the side wall downwardly to the base of the hollow, vertical central column 14.

The spaced bridge beams 16 extending over and across the tank are supported at their center on column 14 and they support the cylindrical baffle 17 which divides the tank into a central mixing zone 18 and an outer settling zone 19. The feed pipe 21 extends beneath tank 11 and is connected to the lower end of column 14 for delivery of the feed into mixing zone 18 through the ports 22 in the upper end of the column. The structure 24 surrounding column 14 depends from the drive mechanism 25 carried by column 14 and is rotated by the drive mechanism. The scraper arms 26 extending over bottom 13 and beneath baffle 17 are carried by structure 24 for scraping the sludge settle on bottom 13 to the sump 27. The sump 27 in tank bottom 13 is located alongside column 14 and the pipe 28 is connected thereto for withdrawal of the sludge.

The structure 31 with the upper portion of side wall 12 of tank 11 defines the overflow trough 32 to which the discharge pipe 33 is connected. The weir 34 along the inner upper edge of the trough determines the water level in the tank which level should be just above inlet ports 22.

The chemicals and raw water after preliminary rapid mixing enter zone 18 through the upper central inlet ports 22 for gentle mixing. The heavier floc which is formed in the mixing zone 18 settles directly downwardly to the bottom 13 of the tank beneath zone 18 and the remainder is carried with the flow beneath baffle 17 and into the settling zone 19. In zone 19 the detention time is sufficient to allow substantially all of the floc formed to settle on tank bottom 3 and the clear or treated water flows over weir 34.

As is known, the thorough mixing of the water and chemicals in zone 18 is required for the efficient use of the chemicals. However, any appreciable turbulence of the water in mixing is deleterious in that the floc which is formed before the mixing is completed is then broken into parts which have a slow rate of settling and tend to be carried over weir 34 with the effluent.

According to the present invention, the flow through the mixing zone from the upper central inlet defined by ports 22 to the lower peripheral outlet beneath baffle 17 is distributed horizontally in the zone and is gently mixed by the vertically arranged paddles 41, 42 and 43. The paddles comprise the frame members 44, 45 and 46 respectively over which the boards 47, 48 and 49 are respectively secured.

The two frame members of each paddle extend from a supporting bracket carried by baffle 17 and on opposite sides of column 14 and structure 25. Each bracket 51, 52 and 53 carries respectively the members 44, 45 and 46 and the brackets are vertically spaced and also equally spaced about the vertical centerline of the mixing zone defined by baffle 17.

The paddles are supported so that they have a modified nutating motion. For such support, the vertical cables 54, 55 and 56 are connected at their upper ends to the outer ends of the arms 57, 58 and 59 of the actuating mechanism 60 supported by column 14 and beams 16 above drive mechanism 25. The arms are spaced 120° and arms 57 and 58 extend over the deck 61 carried by beams 16 and arm 59 extends over the end of the deck and between beams 16. As shown in the drawings, the arms 57, 58 and 59 are joined to form a rigid triangular structure having a central shaft 62 extending therethrough. The fixed universal bearing socket 64 carries the ball 66 fixed on the lower end of shaft 62 and provides the vertical support of the arms. The upper end of shaft 62 is journalled in the bearing wheel 66 carried by the plate 68. Plate 68 turns in the steady-bearing 70 and is fixed to the lower end of shaft 72. The shaft 72 is the output shaft of the gear reducer 74 which is driven by motor 76 and which is supported on the legs 78 above or over arms 57, 58 and 59.

As shown, bearing 66 is offset from shaft 72 and the axis of bearing 66 and shaft 72 intersect at the center of bearing socket 64 so that rotation of plate 68 moves shaft 62 in an orbital manner and arms 57, 58 and 59 are reciprocated vertically in an equally spaced phase relationship.

Brackets 51, 52 and 53 are provided with universal bearing means which interconnect the brackets with the ends of the frame members 41, 42 and 43 of the respective paddles supported thereby and cables 54, 55 and 56 are similarly connected by universal joints to the arms and paddles. More specifically, arms 58 and 59 are connected to paddle 41, arms 57 and 58 are connected to paddle 42 and arms 57 and 59 are connected to paddle 43 so that the paddles are raised and lowered and pivoted about the respective brackets 51, 52 and 53. The motion imparted to each paddle is similar to the nutating movement which the arms 57, 58 and 59 describe except that the support of each paddle by two arms and by a fixed support provides each paddle with rocking and vertical movement which are very approximately sequential. That is, the paddle rocks in one direction, then raises, then rocks in the opposite direction and then lowers. Since each paddle is also disposed at an angle of 120° of the other two paddles, there is therefore no similarity of motion as between any given areas of the paddles which are vertically related, that is, in vertical alignment.

Accordingly, the flow through zone 18 develops no large circulation pattern and it may be said that the paddles have for all practical purposes a random motion although they are, of course, positively driven and have repetitive motions.

The drawings show only several boards 47, 48 and 49 respectively carried by the frame members 44, 45 and 46 and it should be understood that the size and location of the boards may be readily determined and arranged so that the velocity of the eddy currents behind the edges of the paddles is not greater than it should be for gentle mixing. It will be also noted that the different parts of each paddle on each side of their line of symmetry have different vertical velocities so that the use of boards of the same width throughout will itself result in a wide range of different mixing eddies being provided.

In addition to the random mixing which the invention provides, the apparatus itself may be readily installed in any tank. Since the paddles do not rotate on either a horizontal or a vertical axis, the apparatus is particularly adapted to fit in tanks such as shown in the drawings where the sludge removal apparatus requires a center column and a bridge extending from the one side wall of the tank to the column.

Generally, the mixing zone should be round or approximately square. Otherwise, as the drawings will show, the apparatus may be provided with any number of paddles of any size and the paddles may be readily dimensioned and arranged to sweep a relatively wide but shallow mixing zone.

Various modes of carrying out the invention are contemplated as within the scope of the following claims particularly pointing out and distinctly claiming the subject matter which is regarded as the invention.

We claim:

1. Apparatus for gently mixing water and flocculating chemicals contained within a tank and comprising, a vertically arranged series of horizontally disposed paddle frames vertically spaced apart about a vertical central axis, each frame having a separate universal peripheral bearing means supporting the periphery of each frame at one point on the tank, the bearing means for the separate frames being spaced circumferentially about the vertical axis and within the tank, and a drive means positioned above the tank, links connected from the drive means to each paddle frame for moving each frame through the links about said bearing means in a nutating motion by sequentially raising and lowering each frame separately in phased relation from points on each frame spaced from the peripheral bearing means.

2. Apparatus for gently mixing water and flocculating chemicals contained within a tank and comprising, a vertically arranged spaced apart series of paddle frames, each frame having a universal support bearing journalling the frame to the tank and two hanger bearings, each support bearing being located at the periphery of the respective paddle frame, the hanger bearings being located on opposite sides of a line of symmetry extending across the frame from the support bearing through the center of the tank, a supporting base above the tank, a nutating member supported on said base and having arms extending to points above the tank and directly above the hanger bearings of the paddle frames, support rods extending from the ends of the arms to the respective hanger bearings, and a drive mechanism for driving the nutating member to impart a nutating motion to each frame about the support bearing of said frame by sequentially raising and lowering each frame separately in phased relation from the hanger bearings.

3. The invention of claim 2 wherein the lines of symmetry of the paddle frames are angularly spaced about the tank center whereby the motion imparted to the water by the paddles of adjacent frames occurs at different times and a random mixing action is provided.

4. The apparatus of claim 3 which includes an inlet for the chemicals and water which is above the paddle frames and an outlet below the paddle frames whereby the motion of the water through the tank further assures the random motion of the mixing action.

5. The invention of claim 4 wherein the paddle frames are arranged symmetrically about the tank center so that the entire horizontal area of the flow from inlet to outlet passes through all corresponding sections of the paddle frames.

6. Flocculating apparatus for gently mixing water and flocculating chemicals in a tank, the apparatus comprising:
 (a) a plurality of vertically spaced generally horizontally disposed paddle frames within the tank,
 (b) universal bearing means journalling and supporting the periphery of each frame on the tank, the bearing means for each frame being equally spaced from one another around the periphery of the tank,
 (c) vertically extending links connected at their lower end to each frame at points spaced from the bearing means of said frame,
 (d) a rigid nutating member above the paddle frames having a plurality of arms equal in number to the number of horizontally disposed paddle frames, each arm connected to the upper end of one of the links, and
 (e) a drive mechanism supported above the paddle frames and connected to the nutating member for driving the member in a nutating motion so that the arms thereof impart a modified nutating motion to each frame in phased relation about the universal bearing means of each frame.

7. A flocculating apparatus as in claim 6 wherein there are three paddle frames, the bearing means are spaced 120° apart about the periphery of the tank, there are three arms on the rigid nutating member, and there are three links, each link being connected to two frames.

References Cited

UNITED STATES PATENTS

| Re. 21,940 | 11/1941 | Darby et al. | 210—319 |
| 2,291,772 | 8/1942 | Talbot et al. | 210—319 |
| 2,854,222 | 9/1958 | Dening et al. | 259—102 |

SAMIH N. ZAHARNA, *Primary Examiner.*

REUBEN FRIEDMAN, *Examiner.*

J. L. DE CESARE, *Assistant Examiner.*